Figure 1:
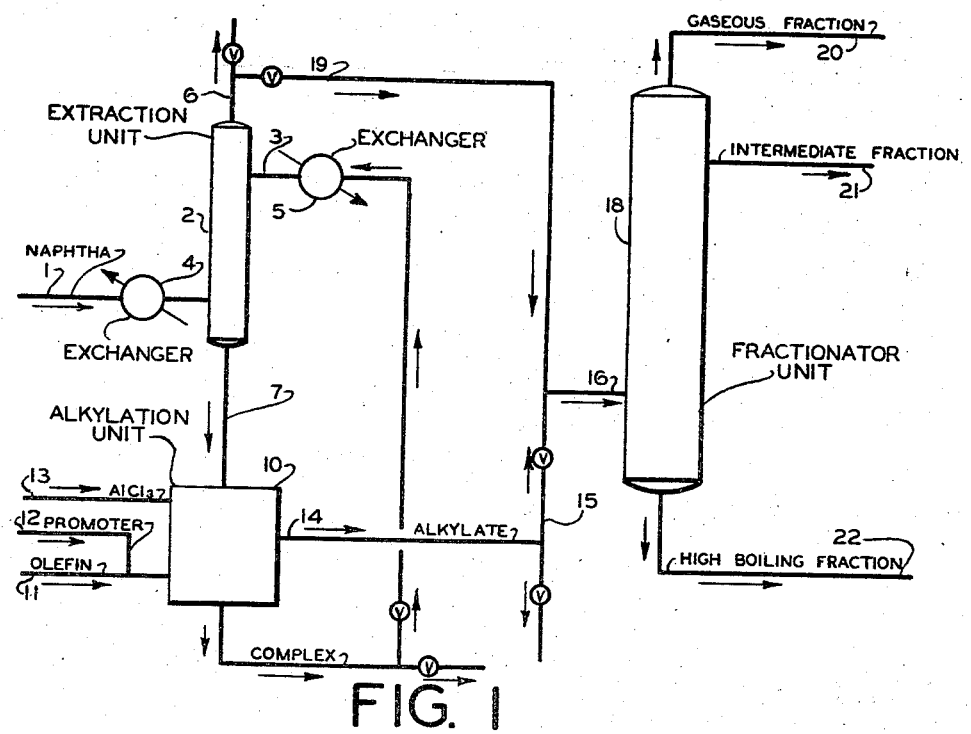

April 16, 1946.     W. R. SMITH ET AL     2,398,563
PROCESS FOR PREPARING BRANCH CHAIN HYDROCARBONS
Filed Dec. 17, 1943

ARTHUR R. GOLDSBY
WILLIAM R. SMITH
INVENTORS

BY

THEIR ATTORNEY

Patented Apr. 16, 1946

2,398,563

UNITED STATES PATENT OFFICE 2,398,563

PROCESS FOR PREPARING BRANCH CHAIN HYDROCARBONS

William R. Smith, Port Arthur, Tex., and Arthur R. Goldsby, Beacon, N. Y., assignors to The Texas Company, New York, N. Y., a corporation of Delaware Application December 17, 1943, Serial No. 514,604

7 Claims. (Cl. 260—671)

This invention relates to manufacture of valuable hydrocarbons.

In accordance with the invention aromatic hydrocarbons are extracted from hydrocarbon mixtures containing them by treatment with a metallic halide-hydrocarbon complex liquid, and the complex liquid containing extracted aromatics is then treated with an olefin hydrocarbon under alkylating conditions to produce valuable alkylation reaction products of olefins and aromatics. The complex, or any portion thereof, from which aromatics have been removed may be reused for extracting further aromatics from fresh feed mixtures.

The feed mixtures may advantageously comprise straight-run naphtha or a fraction thereof rich in the desired aromatic constituents, although the feed to the process may be relatively lean in aromatics. The feed may be a cracked naphtha or cracked naphtha fraction from which olefin constituents have been previously removed. The aromatics may be derived from other sources; for example, they may be derived from isomerized hydrocarbons in which they are present or from the feed to an isomerization process.

One advantageous form of the invention contemplates isomerizing saturated hydrocarbons, such as pentane, with a metallic halide-hydrocarbon complex isomerization catalyst in the presence of a small amount of aromatic hydrocarbons sufficient to inhibit cracking but insufficient to inhibit isomerization to any substantial extent under the reaction conditions prevailing. The reaction is carried out in the presence of hydrogen halide and under conditions of temperature and pressure such that solution of the aromatic hydrocarbons in substantial amount in the complex catalyst occurs.

The complex containing aromatic hydrocarbons removed from the hydrocarbons undergoing isomerization is then separately treated with an olefin hydrocarbon under alkylating conditions such that the olefin reacts with the aromatic hydrocarbons contained in the complex mixture to form valuable hydrocarbons.

An advantageous feature of the process involves effecting solution of the aromatic hydrocarbon in the complex catalyst before contact between the aromatic hydrocarbon and olefin hydrocarbons in the alkylation reaction.

The complex catalyst used in the isomerization and alkylation reactions advantageously comprises a preformed liquid complex formed by reacting a metallic halide, such as aluminum chloride, with aliphatic hydrocarbons such as contained in water-white kerosene. The aluminum chloride and kerosene are reacted in the presence of a small amount of hydrogen chloride at a temperature which may range from about room temperature to 200° F. The reaction mixture is washed or extracted with a light hydrocarbon, such as pentane, at about room temperature to remove unreacted or unstable material. An effective isomerization catalyst is a complex having a heat of hydrolysis in the range about 270 to 350 or even higher and preferably about 300 to 330 calories per gram of complex.

The complex catalyst as used in accordance with the present invention serves as a common catalyst for isomerization and alkylation, as will be described later in the discussion of the drawing.

During continuous operations the complex will comprise complex formed in situ as a result of reaction between aluminum halide and aliphatic constituents of the feed hydrocarbons. Thus, during isomerization of pentane or other saturated naphtha hydrocarbons a small amount of these feed hydrocarbons may enter into complex formation with the aluminum halide.

It has been found that the isomerization of relatively low boiling gasoline hydrocarbons, such as normal pentane, can be carried out to advantage in the presence of relatively small amount of added aromatic material provided somewhat higher reaction temperatures are employed than heretofore. The amount of such aromatic material should be substantially less than 5% and usually not in excess of about 1%; preferably it is about 0.1 to 0.6% by weight of the hydrocarbon undergoing treatment. This small amount of aromatic material greatly reduces the extent of cracking and other side reactions which would otherwise occur at the reaction temperatures employed. In addition, the aromatic material is effective in maintaining fluidity of the complex catalyst during continuous operations with the same catalyst.

Isomerization in the presence of a small amount of added aromatic hydrocarbon is advantageous when treating other gasoline hydrocarbons or fractions of gasoline boiling up to about 400° F.

The added aromatic material used for inhibiting cracking in the isomerization reaction may comprise an aromatic hydrocarbon such as benzene, toluene, xylene, etc., or even higher boiling aromatics.

The complex catalyst containing aromatic hydrocarbons is passed to a separate treating zone wherein it may be treated with an olefin, such as propylene, in the presence of promoter under conditions effective to cause reaction between xylene and propylene. The alkylated hydrocarbon product is separated from the complex catalyst and the recovered or residual complex returned to the isomerization reaction.

Where it is desired merely to extract desired aromatic constituents from a hydrocarbon mixture containing them, the extraction of the feed mixture with complex may be carried out in an extraction tower in the substantial absence of a promoter so that solution of the desired aromatic material in the complex is effected without catalytic conversion of hydrocarbons of the feed mixture taking place.

The invention is applicable to the treatment of gasoline fractions to effect separation therefrom of aromatic hydrocarbons such as benzene, toluene, xylene, and aromatics of even higher molecular weight, than reacting the extracted aromatic hydrocarbons in the presence of the complex and hydrogen halide promoter with an olefin under alkylating conditions so that the complex serves as a catalyst for the alkylation reaction. Alkylation of xylene with propylene has already been mentioned and it is contemplated that benzene, for example, may be alkylated with ethylene to produce ethyl benzene.

Reference will now be made to Figure 1 of the accompanying drawing illustrating a method of flow suitable for the treatment of naphtha or a naphtha fraction containing an aromatic material such as benzene for the purpose of converting the benzene into ethyl benzene.

As illustrated in the drawing, a feed naphtha is drawn from a source, not shown, through pipe 1 leading to the lower portion of an extraction column 2. The naphtha may be a straight-run naphtha or a hydroformed naphtha, or fraction of such naphtha boiling in the range of about 150 to 250° F., and from which olefin constituents have been removed. The extraction column 2 may comprise a tower packed with contact material such as Raschig rings or berl saddles.

A stream of aluminum halide-kerosene complex is continuously introduced to the upper portion of the column 2 through a pipe 3.

The temperatures of extraction maintained within the column 2 are controlled by adjusting the temperatures of the entering naphtha and complex streams by passage through suitable heat exchangers 4 and 5 respectively. Thus the average extraction temperature within the column 2 is advantageously maintained at a temperature in the range about 50 to 150° F. such that benzene is dissolved in the complex, the non-aromatic hydrocarbon constituents of the naphtha remaining substantially insoluble in the complex.

The undissolved hydrocarbons are continuously discharged from the top of the column 2 through a pipe 6 while the complex containing dissolved benzene is continuously drawn off through a pipe 7.

The complex containing dissolved benzene is passed to an alkylation unit 10 which may be of conventional design involving a single or a plurality of reaction stages.

An olefin hydrocarbon, as for example ethylene, is conducted from a source, not shown, through a pipe 11 to the unit 10 and, in addition, a promoter such as hydrogen chloride is also introduced from a source, not shown, through a pipe 12.

Additional aluminum chloride also may be introduced to the unit 10 through a pipe 13, if necessary. The amount of aluminum halide so added is sufficient to maintain the complex in the alkylation zone active as an alkylation catalyst during continued use in continuous operations. An active complex catalyst is one characterized by having a heat of hydrolysis of about 225 to 330 calories per gram of complex, or in the range about 200 to 400.

The alkylation reaction is effected at a temperature in the range about 80 to 160° F. using a sufficient amount of ethylene to react with the benzene to form alkylated benzene. The resulting alkylate is drawn off through a pipe 14 and may be separately disposed of. If desired, all or a portion of the alkylate may be conducted through a branch pipe 15 communicating with a pipe 16 leading to a fractionating unit 18.

The non-aromatic hydrocarbons removed from the column 2 through pipe 6 may be passed, all or in part, through a branch pipe 19 communicating with the aforesaid pipe 16.

The fractionating unit 18 may be of conventional design involving one or more separate towers, if desired. The hydrocarbons passing to the unit may be separated into any number of desired fractions; for example, a normally gaseous fraction is removed through a pipe 20 while an intermediate fraction may be removed through a pipe 21. Higher boiling hydrocarbons may be discharged through a pipe 22.

While the extraction of benzene is specifically referred to in the operation illustrated in Figure 1, it is contemplated that the method of flow is applicable where it is desired to extract other aromatic hydrocarbons or a mixture of aromatic hydrocarbons from the naphtha undergoing treatment.

Figure 2:
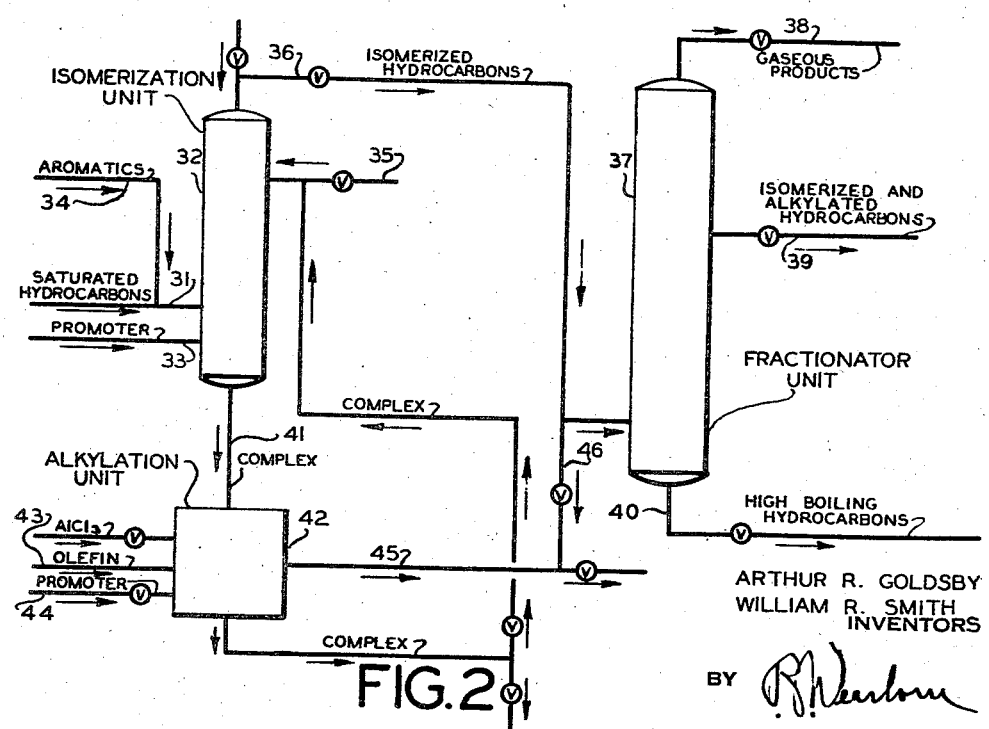

Figure 2 illustrates a method of flow which may be employed for a combination of isomerization and alkylation. In the isomerization stage a saturated gasoline hydrocarbon such as normal pentane is isomerized in the presence of an added high boiling aromatic hydrocarbon such as xylene or in the presence of a naphtha fraction containing xylene or other high boiling aromatic hydrocarbons.

As indicated in Figure 2, a saturated hydrocarbon, such as normal pentane, or a mixture of saturated hydrocarbons is drawn from a source, not shown, and conducted through a pipe 31 to an isomerization unit 32. The isomerization unit advantageously comprises a tower-type of reactor although other conventional types of apparatus may be employed.

A promoter such as hydrogen chloride is introduced to the reaction from a source, not shown, through a pipe 33 while the aromatic hydrocarbon, such as xylene, is introduced from a source, not shown, through a pipe 34.

It will be understood, of course, that if the isomerization reaction is carried out in a plurality of reaction zones or stages, the promoter and aromatic hydrocarbon may be introduced to the reaction at one or more zones or stages.

Fresh catalyst, for example, aluminum chloride dissolved in feed hydrocarbon, may be introduced to the system through a pipe 35.

The amount of aluminum chloride added through pipe 35 is merely sufficient to fortify the complex liquid catalyst being returned to the tower from the alkylation unit to which reference will be made later.

In the isomerization unit 32, the saturated feed hydrocarbon is subjected to countercurrent contact with the liquid isomerization catalyst at a temperature in the range about 150 to 250° F.

A small amount of hydrogen chloride is maintained in the reaction tower, amounting to about 3 to 5% by weight of the saturated feed hydrocarbon undergoing treatment. The xylene is added to the reaction in an amount equal to about one to six tenths per cent by weight of the saturated feed hydrocarbon.

The reaction tower is maintained under pressure sufficient to keep the feed hydrocarbons undergoing treatment in a liquid phase.

The reacted hydrocarbons are conducted from the isomerization unit through pipe 36 leading to a fractionation unit 37 which may comprise one or more separate towers, if desired. In the fractionation unit the reacted hydrocarbons may be separated into any number of desired fractions and with provision for removing a fraction comprising gaseous products which may be discharged through a pipe 38. Isomerized hydrocarbons may be discharged through a pipe 39 while a fraction composed of higher boiling hydrocarbons may be discharged through pipe 40.

A stream of complex catalyst liquid containing dissolved xylene is continuously drawn off from the isomerization unit 32 through a pipe 41 to an alkylation unit 42 similar to that described in connection with Figure 1. A normally gaseous olefin, such as propylene, is introduced from a source, not shown, through a pipe 43 while additional promoter, if necessary, may be introduced through a pipe 44.

Make-up aluminum chloride may be added as indicated.

The reaction is effected at a temperature in the range about 30° F. to 160° F. using a sufficient amount of olefin to react with xylene to form alkylated xylenes.

The resulting alkylate is drawn off through a pipe 45 and may be separately disposed of. If desired, all or a portion of the alkylate may be conducted through a branch pipe 46 communicating with the previously mentioned pipe 36 by which means it is conducted to the fractionation unit 37 for fractionation in the presence of the isomerized hydrocarbons.

In this way the mixture of isomerized and alkylated hydrocarbons may be fractionated to form a blend or blends of isomerized and alkylated hydrocarbons boiling within any desired boiling range, as for example, boiling in a range suitable for use as motor fuel.

While specific mention has been made of reacting benzene with ethylene, and xylene with propylene, nevertheless, the treatment of other aromatic hydrocarbons with other olefins is contemplated. For example, benzene may be reacted with propylene to form cumene; toluene may be reacted with propylene to form cymene; and xylene may be reacted with different types of olefin to form alkylated xylenes.

The alkylation reactions may be carried out at a temperature in the range about 30 to 160° F.

It is contemplated introducing the olefin to the alkylation reaction under conditions such that the aromatic hydrocarbon undergoing alkylation is in substantial molar excess over the olefin.

The separation of alkylated hydrocarbons from the complex may involve settling or distillation under reduced pressure, or a combination of both. It may involve extracting the alkylated hydrocarbons from the complex by washing with a solvent such as a low boiling hydrocarbon, for example, pentane.

While aluminum chloride has been specifically mentioned, other metallic halide catalysts may be used, such as aluminum bromide, zirconium chloride, etc. Other hydrogen halides besides hydrogen chloride may be used as the promoter. The amount of such promoter may range from one to five per cent basis feed hydrocarbon.

The feed hydrocarbon may be treated prior to contact with the catalyst for the purpose of removing impurities such as sulfur compounds, such treatment being effected with caustic soda, acid or absorbent clay, or relatively spent catalyst obtained in the process. As previously mentioned, it is desirable to remove olefins from the feed hydrocarbons prior to extraction of the aromatic constituents since olefins are soluble in the complex and react readily with aluminum chloride. Olefin removal may be effected by polymerization.

Where the process involves isomerization of feed hydrocarbon containing relatively large amount of aromatic hydrocarbons, it is contemplated pretreating the feed to the isomerization step so as to reduce the aromatic content to within the prescribed limits prior to the isomerization step. In this connection the naphtha feed may be passed through an extraction tower 2 such as illustrated in Figure 1 wherein the aromatic hydrocarbons are extracted in the complex leaving a residual naphtha stock retaining aromatic hydrocarbons within the prescribed limits requisite for inhibiting cracking in the subsequent isomerizing step. The naphtha from which the bulk of the aromatic constituents has thus been extracted is then passed to a separate reaction zone wherein isomerization is effected. The extract comprising complex and dissolved aromatics is then passed to the alkylation unit 10 as described in Figure 1.

Mention has been made of dissolving aromatic hydrocarbons in the complex for subsequent alkylation. However, it is contemplated that the extraction may be carried out under conditions such that aromatics so extracted by the complex may exist therein in loose chemical combination with aluminum halide. They may to some extent enter into complex formation with aluminum halide that may be available in the aluminum halide-aliphatic hydrocarbon complex used as the extraction medium. Under the influence of sufficiently high temperatures, aromatics may enter into such complex formation to a substantial extent in carrying out either the extraction or isomerization operations. Irrespective of the form in which the aromatics exist in the complex as obtained from the extraction or isomerization stages, it is contemplated effecting substantial alkylation by the subsequent treatment with olefins and removal of the resulting alkylate from the complex.

It is also contemplated that aromatics from an extraneous source may be passed to the alkylation reaction to supplement those undergoing alkylation.

The olefins used in the alkylation reaction may be used in substanitally pure form or in admixture with paraffin hydrocarbons. For example, when alkylating with propylene, a $C_3$ fraction containing about 30% propylene and about 70% propane may be used. Under certain circumstances the presence of the paraffin may be advantageous in the alkylation reaction.

This application is a continuation-in-part of our copending patent application, Serial No. 472,438, filed January 15, 1943.

Obviously many modifications and variations of the invention, as hereinbefore set forth, may be made without departing from the spirit and scope thereof and therefore only such limitations should be imposed as are indicated in the appended claims.

We claim:

1. A continuous process for preparing branch chain hydrocarbons which comprises passing a saturated straight chain feed hydrocarbon containing a small amount of aromatic hydrocarbons, not in excess of about 1% by weight, to a reaction zone, subjecting the feed hydrocarbons to contact therein with a liquid isomerization catalyst comprising aluminum halide-hydrocarbon complex maintained in the presence of hydrogen halide at a temperature effective for promoting isomerization as the principal reaction, effecting substantial isomerization in the presence of said aromatic hydrocarbons, the conversion being accompanied by solution of at least a portion of said aromatic hydrocarbons in the complex, discharging isomerized hydrocarbons from the reaction zone, continuously withdrawing aluminum halide-hydrocarbon complex containing dissolved aromatic hydrocarbons from said reaction zone, subjecting said withdrawn complex mixture to contact with an olefin hydrocarbon at a temperature effective for promoting the alkylation of aromatic constituents of said complex with said olefin to form alkylated hydrocarbons, effecting substantial alkylation of said aromatics discharging alkylated hydrocarbons, and recycling the residual complex to the isomerization reaction zone.

2. A continuous process for preparing branch chain hydrocarbons which comprises passing a saturated straight chain feed hydrocarbon containing a small amount of aromatic hydrocarbons, not in excess of about 1% by weight to a reaction zone, subjecting the feed hydrocarbons to contact therein with a liquid isomerization catalyst comprising aluminum halide-hydrocarbon complex maintained in the presence of hydrogen halide at a temperature effective for promoting isomerization as the principal reaction, effecting substantial isomerization in the presence of said aromatic hydrocarbons, the conversion being accompanied by solution of at least a portion of said aromatic hydrocarbons in the complex, discharging isomerized hydrocarbons from the reaction zone, continuously withdrawing aluminum halide-hydrocarbon complex containing dissolved aromatic hydrocarbons from said reaction zone, subjecting said withdrawn complex mixture to contact with an olefin hydrocarbon at a temperature effective for promoting the alkylation of aromatic constituents of said complex with said olefin to form alkylated hydrocarbons, effecting substantial alkylation of said aromatics, discharging alkylated hydrocarbons, recycling the residual complex to the isomerization reaction zone, subjecting hydrocarbons discharged from both said reactions to fractionation in the presence of each other, and forming a blend of isomerized and alkylated hydrocarbons.

3. A continuous process for isomerizing saturated hydrocarbons which comprises passing feed hydrocarbon containing a small amount of aromatic hydrocarbon, substantially less than 5% by weight to a reaction zone, subjecting the feed hydrocarbon to contact therein with an isomerization catalyst comprising aluminum halide maintained in the presence of hydrogen halide at a temperature effective for promoting isomerization as the principal reaction, effecting substantial isomerization in the presence of said aromatic hydrocarbon, the conversion being accompanied by formation of metallic halide-aromatic hydrocarbon complex, discharging isomerized hydrocarbons from the reaction zone, continuously withdrawing metallic halide-aromatic hydrocarbon complex from said reaction zone, subjecting said withdrawn complex to contact with an olefin hydrocarbon at a temperature effective for promoting the alkylation of aromatic constituents of said complex with said olefin to form alkylated hydrocarbons, effecting substantial alkylation of said aromatics discharging alkylated hydrocarbons and recycling remaining metallic halide to the isomerization reaction zone.

4. A continuous process for preparing branched-chain hydrocarbons which comprises passing a saturated straight-chain feed hydrocarbon containing a small amount of aromatic hydrocarbons, not in excess of about 1% by weight, to a reaction zone, subjecting the feed hydrocarbon to contact therein with a liquid isomerization catalyst comprising aluminum halide-hydrocarbon complex maintained in the presence of hydrogen halide at a temperature effective for promoting isomerization of normal paraffin constituents of the feed, effecting substantial isomerization in the presence of said aromatic hydrocarbons, the conversion being accompanied by absorption of at least a portion of said aromatic hydrocarbons in the complex, discharging isomerized hydrocarbons from the reaction zone, continuously passing complex and absorbed aromatic hydrocarbons from said reaction zone to an alkylation reaction zone, adding aluminum halide to the reaction zone in sufficient amount to maintain therein a complex characterized by having a heat of hydrolysis in the range about 225 to 330 calories, subjecting the complex mixture therein to contact with an olefin hydrocarbon in the presence of hydrogen halide at a temperature effective for promoting alkylation of aromatic constituents of said complex mixture with said olefin, effecting substantial alkylation of said aromatic constituents, discharging alkylated hydrocarbons and complex from the alkylation zone and recycling discharged complex to the isomerization reaction zone.

5. A continuous process for treating a hydrocarbon feed mixture of normal paraffin hydrocarbons and substantially less than 5% by weight aromatic hydrocarbons, said feed mixture being substantially free from olefins, and boiling within the range of gasoline which comprises passing a stream of said feed mixture to a reaction zone, subjecting said stream within said zone to countercurrent contact with a stream of aluminum halide-hydrocarbon complex in the presence of hydrogen halide at a temperature within the range about 50 to 250° F. and effective for promoting isomerization of normal paraffins such that normal paraffins are isomerized and aromatic constituents of said feed mixture are absorbed in the complex to form a complex mixture, continuously passing a stream of said complex mixture from the reaction zone to an alkylating zone, maintaining sufficient aluminum halide in said alkylating zone such that the complex is characterized by having a heat of hydrolysis in the range about 225 to 330° F., subjecting said complex mixture to contact with an olefin hydrocarbon in the presence of hydrogen halide at a temperature effective for promoting the alkylation of said aromatic hydrocarbons with said olefin, effecting substantial alkylation of said aromatic hydrocarbons, continuously discharging complex and alkylated hydrocarbons from the alkylation zone, recycling discharged complex to the reaction zone and continuously discharging paraffin hydrocarbons from said reaction zone.

6. The process according to claim 5 in which paraffin hydrocarbons and discharged alkylated hydrocarbons are passed to a fractionating zone and therein subjected to fractionation in the presence of each other.

7. The process according to claim 5 in which aluminum halide is added to the alkylation zone in sufficient amount to maintain the heat of hydrolysis of the complex therein at about 225 to 330 calories per gram of complex.

WILLIAM R. SMITH.
ARTHUR R. GOLDSBY.